US008073700B2

(12) United States Patent
Jaramillo et al.

(10) Patent No.: US 8,073,700 B2
(45) Date of Patent: Dec. 6, 2011

(54) RETRIEVAL AND PRESENTATION OF NETWORK SERVICE RESULTS FOR MOBILE DEVICE USING A MULTIMODAL BROWSER

(75) Inventors: David Jaramillo, Lake Worth, FL (US); Marc White, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1151 days.

(21) Appl. No.: 11/422,093

(22) Filed: Jun. 5, 2006

(65) Prior Publication Data

US 2007/0061146 A1 Mar. 15, 2007

Related U.S. Application Data

(60) Provisional application No. 60/716,249, filed on Sep. 12, 2005.

(51) Int. Cl.
*G10L 21/06* (2006.01)
(52) U.S. Cl. .................................................. 704/270.1
(58) Field of Classification Search ................ 704/270.1
See application file for complete search history.

(56) References Cited

U.S. PATENT DOCUMENTS

| | | | |
|---|---|---|---|
| 5,884,262 A | 3/1999 | Wise et al. | |
| 5,953,392 A | 9/1999 | Rhie et al. | |
| 6,031,467 A | 2/2000 | Hymel et al. | |
| 6,084,583 A | 7/2000 | Gerszberg et al. | |
| 6,101,472 A | 8/2000 | Giangarra et al. | |
| 6,128,651 A | 10/2000 | Cezar | |
| 6,141,010 A | 10/2000 | Hoyle | |
| 6,157,841 A | 12/2000 | Bolduc et al. | |
| 6,298,218 B1 | 10/2001 | Lowe et al. | |
| 6,332,127 B1 | 12/2001 | Bandera et al. | |
| 6,381,465 B1 | 4/2002 | Chern et al. | |
| 6,397,057 B1 | 5/2002 | Malackowski et al. | |
| 6,400,806 B1 | 6/2002 | Uppaluru | |
| 6,401,085 B1 | 6/2002 | Gershman et al. | |
| 6,405,123 B1 | 6/2002 | Rennard et al. | |
| 6,452,498 B2 | 9/2002 | Stewart | |
| 6,484,148 B1 | 11/2002 | Boyd | |

(Continued)

FOREIGN PATENT DOCUMENTS

EP 0854417 A2 7/1998

(Continued)

OTHER PUBLICATIONS

Franz et al., "Searching the Web by Voice", International Conference on Computational Linguistics, Proceedings of Coling, XX, XX, 2002, pp. 1213-1217.

(Continued)

*Primary Examiner* — Susan McFadden
(74) *Attorney, Agent, or Firm* — Wolf, Greenfield & Sacks, P.C.

(57) ABSTRACT

A method of obtaining information using a mobile device can include receiving a request including speech data from the mobile device, and querying a network service using query information extracted from the speech data, whereby search results are received from the network service. The search results can be formatted for presentation on a display of the mobile device. The search results further can be sent, along with a voice grammar generated from the search results, to the mobile device. The mobile device then can render the search results.

28 Claims, 3 Drawing Sheets

U.S. PATENT DOCUMENTS

| | | | |
|---|---|---|---|
| 6,529,159 B1 | 3/2003 | Fan et al. | |
| 6,552,682 B1 | 4/2003 | Fan | |
| 6,560,456 B1 | 5/2003 | Lohtia et al. | |
| 6,600,736 B1 | 7/2003 | Ball et al. | |
| 6,601,026 B2* | 7/2003 | Appelt et al. | 704/9 |
| 6,606,611 B1 | 8/2003 | Khan | |
| 6,608,556 B2 | 8/2003 | DeMoerloose et al. | |
| 6,647,269 B2 | 11/2003 | Hendrey et al. | |
| 6,658,389 B1 | 12/2003 | Alpdemir | |
| 6,664,922 B1 | 12/2003 | Fan | |
| 6,769,010 B1 | 7/2004 | Knapp et al. | |
| 6,826,614 B1 | 11/2004 | Hanmann et al. | |
| 6,842,767 B1 | 1/2005 | Partovi et al. | |
| 6,862,445 B1 | 3/2005 | Cohen | |
| 6,885,736 B2 | 4/2005 | Uppaluru | |
| 6,895,084 B1* | 5/2005 | Saylor et al. | 379/88.22 |
| 6,965,864 B1* | 11/2005 | Thrift et al. | 704/275 |
| 6,978,136 B2 | 12/2005 | Jenniges et al. | |
| 6,999,930 B1* | 2/2006 | Roberts et al. | 704/270.1 |
| 7,016,845 B2* | 3/2006 | Vora et al. | 704/270.1 |
| 7,020,609 B2* | 3/2006 | Thrift et al. | 704/270.1 |
| 7,028,306 B2* | 4/2006 | Boloker et al. | 719/310 |
| 7,113,911 B2* | 9/2006 | Hinde et al. | 704/270.1 |
| 7,136,846 B2 | 11/2006 | Chang et al. | |
| 7,137,126 B1* | 11/2006 | Coffman et al. | 719/328 |
| 7,210,098 B2* | 4/2007 | Sibal et al. | 715/205 |
| 7,257,575 B1* | 8/2007 | Johnston et al. | 707/4 |
| 7,359,723 B2 | 4/2008 | Jones | |
| 7,415,537 B1* | 8/2008 | Maes | 709/246 |
| 7,457,397 B1* | 11/2008 | Saylor et al. | 379/88.17 |
| 7,477,909 B2 | 1/2009 | Roth | |
| 7,493,259 B2* | 2/2009 | Jones et al. | 704/257 |
| 7,493,260 B2* | 2/2009 | Harb et al. | 704/270 |
| 7,505,978 B2* | 3/2009 | Bodin et al. | 707/10 |
| 7,509,260 B2* | 3/2009 | Cross et al. | 704/270.1 |
| 7,545,917 B2* | 6/2009 | Jones et al. | 379/88.02 |
| 7,564,959 B2* | 7/2009 | Greenaae et al. | 379/111 |
| 7,603,291 B2* | 10/2009 | Raiyani et al. | 705/26 |
| 7,801,728 B2* | 9/2010 | Ben-David et al. | 704/270 |
| 7,808,980 B2* | 10/2010 | Skakkebaek et al. | 370/354 |
| 7,809,575 B2* | 10/2010 | Ativanichayaphong et al. | 704/270 |
| 7,822,608 B2* | 10/2010 | Cross et al. | 704/270 |
| 7,827,033 B2* | 11/2010 | Ativanichayaphong et al. | 704/255 |
| 2001/0051517 A1 | 12/2001 | Strietzel | |
| 2002/0062393 A1 | 5/2002 | Borger et al. | |
| 2002/0087408 A1 | 7/2002 | Burnett | |
| 2002/0095472 A1 | 7/2002 | Berkowitz et al. | |
| 2003/0024975 A1 | 2/2003 | Rajasekharan | |
| 2003/0078779 A1 | 4/2003 | Desai et al. | |
| 2003/0125958 A1 | 7/2003 | Alpdemir et al. | |
| 2003/0171926 A1 | 9/2003 | Suresh et al. | |
| 2004/0006478 A1 | 1/2004 | Alpdemir et al. | |
| 2004/0076279 A1 | 4/2004 | Taschereau | |
| 2004/0140989 A1 | 7/2004 | Papageorge | |
| 2004/0203766 A1 | 10/2004 | Jenniges et al. | |
| 2004/0224662 A1 | 11/2004 | O'Neil et al. | |
| 2005/0004840 A1 | 1/2005 | Wanninger | |
| 2005/0015256 A1 | 1/2005 | Kargman | |
| 2005/0021744 A1 | 1/2005 | Haitsuka et al. | |
| 2005/0033582 A1 | 2/2005 | Gadd et al. | |
| 2005/0054381 A1 | 3/2005 | Lee et al. | |
| 2006/0004627 A1 | 1/2006 | Baluja | |
| 2006/0150119 A1 | 7/2006 | Chesnais et al. | |
| 2007/0032229 A1 | 2/2007 | Jones | |
| 2007/0099636 A1 | 5/2007 | Roth | |
| 2007/0169143 A1 | 7/2007 | Li | |
| 2007/0174244 A1 | 7/2007 | Jones | |
| 2007/0174904 A1 | 7/2007 | Park | |
| 2007/0185768 A1 | 8/2007 | Vengroff et al. | |
| 2007/0185843 A1 | 8/2007 | Jones et al. | |
| 2008/0027707 A1 | 1/2008 | Stefik et al. | |

FOREIGN PATENT DOCUMENTS

| | | |
|---|---|---|
| EP | 1143679 A2 | 10/2001 |
| WO | WO 00/77978 A2 | 12/2000 |
| WO | WO 01/91488 A1 | 11/2001 |
| WO | WO 02/31814 A1 | 4/2002 |
| WO | WO0231814 A1 | 4/2002 |
| WO | WO 02/41169 A1 | 5/2002 |
| WO | WO 2004/054217 A1 | 6/2004 |
| WO | WO 2005/020094 A1 | 3/2005 |
| WO | WO 2007031447 A1 | 3/2007 |

OTHER PUBLICATIONS

Dalianis, et al., "Siteseeker Voice—A speech controlled search engine", Wapalizer Paper, pp. 1-2, Feb. 25 (2003).

Carmichael, "Robustness in Speech Based Interfaces: Sharing the Tricks of the Trade", <www.ida.liu.se/{nlplab/chi-ws-02/papers.shtml>, retrieved Oct. 31, 2006.

Wyard et al., "Spoken Language Systems—Beyond Prompt and Response", BT Technology Journal, Springer, Dordrecht, NL, vol. 14, No. 1, Jan. 1996.

Axelsson et al., "Mobile X+V 1.2", Voice XML Organization, Sep. 5, 2005, <www.voicexml.org/specs/multimodal/x+v/mobile/12/>, retrieved Oct. 31, 2006.

Hunt et al., "Speech Recognition Grammar Specification Version 1.0", W3C Recommendation, Mar. 16, 2004, <www.w3.org/TR/speech-grammar/>, retrieved Oct. 31, 2006.

Van Tichelen, "Semantic Interpretation for Speech Recognition", W3C Working Draft, Nov. 8, 2004, <www.w3.org/TR/2004/WD-semantic-interpretation-20041108/>, retrieved Oct. 31, 2006.

White, "Multimodal Interaction and the Mobile Web, Part 2: Simple searches with Find-it", Dec. 6, 2005, <www-128.ibm.com/developerworks/library/wi-mobweb2/index.html>, retrieved Nov. 29, 2006.

Dalianis et al. "SiteSeeker Voice—A speech controlled search engine," (Feb. 25, 2003), http://www.nada.kth.se/hercules/wapalizer/SiteSeekerVoice.html> retrieved on Oct. 30, 2006.

Hemphill et al. "Surfing the Web by Voice," *Proceedings ACM Multimedia*, Nov. 1995, pp. 215-222 (Nov. 1995).

International Search Report and Written Opinion PCT/US2006/038411, mailed Mar. 5, 2007.

*Nokia 616 Car Kit*, [online] [retrieved on Sep. 29, 2005], retrieved from the Internet <URL: http://europe.nokia.com/nokia/0,,65324,00.html>.

*Google Short Message Service (SMS)*, [online] [retrieved on Sep. 29, 2005], retrieved from the.Internet <URL: http://www.google.com/sms/>.

International Search Report from PCT/EP2006/066037 mailed Nov. 17, 2006.

International Preliminary Report on Patentability and Written Opinion from PCT/EP2006/066037, issued Mar. 18, 2008.

* cited by examiner

RETRIEVAL AND PRESENTATION OF NETWORK SERVICE RESULTS FOR MOBILE DEVICE USING A MULTIMODAL BROWSER

CROSS-REFERENCE TO RELATED APPLICATIONS

This application claims the benefit of U.S. Provisional Patent Application Ser. No. 60/716,249, which was filed in the U.S. Patent and Trademark Office on Sep. 12, 2005, and which is fully incorporated herein by reference.

BACKGROUND

1. Field of the Invention

The present invention relates to pervasive computing.

2. Description of the Related Art

A growing number of Web services are being made available to software developers. In general, a Web, or network, service refers to programmable application logic, which is made available to "consumer" applications via standard Internet protocols. Typically, a Web service is self-describing, self-contained, and modular in nature. Consumer applications access the Web service via protocols including Hypertext Transfer Protocol (HTTP) and Extensible Markup Language (XML)-based standards such as Simple Object Access Protocol (SOAP), Web Services Description Language (WSDL), and Universal Description Discovery and Integration (UDDI).

One common function of a Web service is to provide developers with access to different data sets via search engines. Examples of data sets that can be searched via a Web service and/or search engine can include, but are not limited to, weather information, traffic conditions, on-line auctions, and the like. For the most part, users access Web services from consumer applications which execute on conventional computer systems, and thus, have a standard sized display or monitor. The display provides a suitable visual interface through which the user can interact with the application and/or the Web service.

Pervasive computing has garnered significant attention in recent years. Pervasive computing refers to an emerging trend in which computing devices are increasingly ubiquitous, numerous, and mobile. In practical terms, the rise of pervasive computing has meant that users are accessing applications and/or Web services through smaller portable and/or otherwise mobile devices such as portable phones, personal digital assistants, embedded systems, or the like. Users use these portable devices in lieu of more conventional desktop computer systems. These smaller devices have correspondingly smaller displays, making it difficult for users to interact with applications and Web services using purely visual means. Conventional user interaction techniques for mobile devices which involve the use of a stylus and on-screen keyboard or handwriting recognition, however, do not provide users with a fast and accurate means of communication.

It would be beneficial to provide a technique which allows a user to quickly and intuitively access Web services via a mobile computer system which overcomes the limitations described above.

SUMMARY OF THE INVENTION

The present invention provides a solution for obtaining and/or retrieving search results over a network. One embodiment of the present invention can include a method of obtaining information using a mobile device including receiving a request including speech data from the mobile device, and querying a network service using query information extracted from the speech data, whereby search results are received from the network service. The search results can be formatted for presentation on a display of the mobile device. The search results further can be sent, along with a voice grammar generated from the search results, to the mobile device. The mobile device then can render the search results.

Another embodiment of the present invention can include a method of obtaining information using a mobile device. The method can include receiving a request including speech data from the mobile device and dynamically building a query using the speech data. The query can be sent to a network service and, in response, search results can be received from the network service. The method also can include dynamically creating a voice grammar from the search results and creating a multi-modal markup language document including the search results and the voice grammar and sending the multi-modal markup language document to the mobile device.

Yet another embodiment of the present invention can include a machine readable storage, having stored thereon a computer program having a plurality of code sections executable by a machine. The code sections can cause the machine to perform the various steps disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a method, system, and apparatus for obtaining information from a network service. For example, the present invention can be used to obtain information from search engines and/or other Web services or can function as a Web service in and of itself. In accordance with the inventive arrangements disclosed herein, users can speak into a mobile device which hosts a multimodal browser. The speech data collected from the user's spoken utterance can be converted into a query, which can be forwarded to a network service. Results obtained from the query can be processed for presentation upon a display of the mobile device. For example, results can be formatted using an appropriate markup language. A grammar can be dynamically generated from the search results and included with the markup language document that specifies the search results. The resulting markup language document then can be sent to the mobile device.

Figure 1:
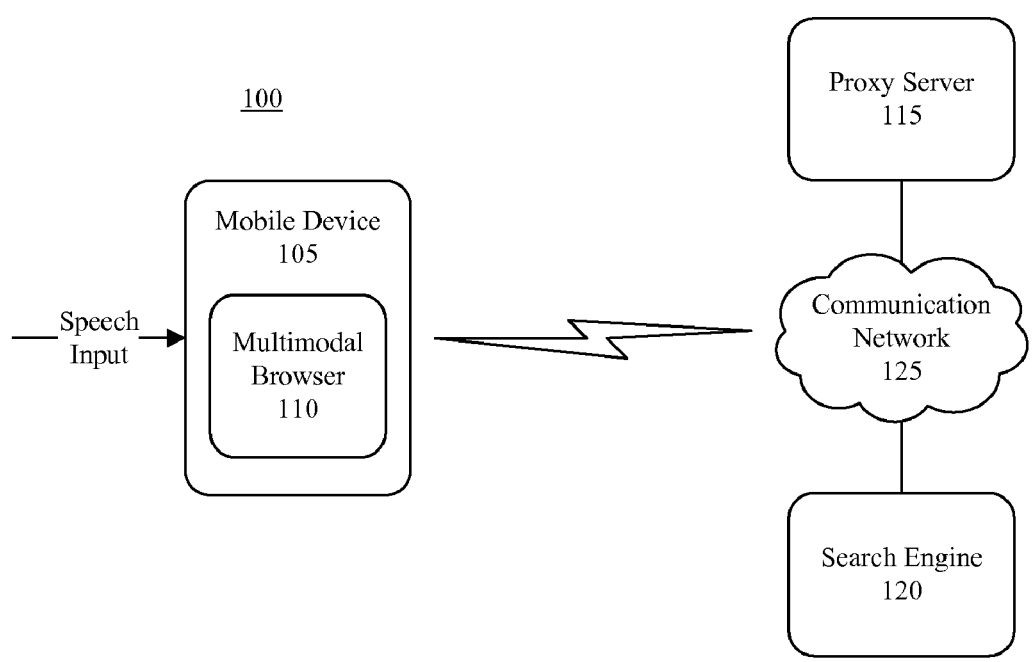
FIG. 1 is a block diagram illustrating a system for retrieving information from a network-based service in accordance with one embodiment of the present invention.

FIG. 1 is a block diagram illustrating a system 100 for retrieving information from a network-based service in accordance with one embodiment of the present invention. As shown, system 100 can include a mobile device 105, a proxy server 115, and a search engine 120. The mobile device 105, the proxy server 115, and the search engine 120 can communicate via a communications network 125. The communications network 125 can include, but is not limited to, a wide area network, a local area network, the Public Switched Telephone Network (PSTN), the Web, the Internet, and one or more intranets. The communications network 125 further can include one or more wireless networks, whether short or long range. For example, in terms of short range wireless networks, the communication network 125 can include a local wireless network built using a Bluetooth or one of the 802.11x wireless communication protocols. In terms of long range wireless networks, the communication network 125 can include a mobile, cellular, and or satellite-based wireless network.

The mobile device 105 can be a handheld device such as a personal digital assistant (PDA), a mobile phone, or the like. In another embodiment, the mobile device can function as a component that is embedded within a larger system such as a larger computer system or a vehicle such as an automobile, plane, boat, or the like. In any case, mobile device 105 can include audio input and output hardware, i.e. a microphone and speaker along with the necessary audio circuitry for digitizing audio and for playing, or rendering, digitized audio via the speaker.

The mobile device 105 can execute an operating system (not shown) and also a multimodal browser 110. The term "multimodal" refers to the ability of the browser 110 to use multiple modes or channels for interactions with a user and/or other computer system within a same communication session. Different modes of interaction can include, but are not limited to, speech, keyboard data entry, touch screen data entry, and stylus data entry. Depending on the situation and the physical configuration and capabilities of mobile device 105, a combination of different input modes can be used for entering data. For example, when executing within a PDA, the multimodal browser 110 can allow a user to select items by tapping on a touch sensitive display as well as by providing spoken input. Similarly, a user can enter data into a given field using either voice input and/or a stylus. Multimodal browser 110 further can visually display and audibly play information to users.

In one embodiment, the multimodal browser 110 can render markup language documents. The particular type of markup language that can be rendered by multimodal browser 110 can be one that is suited for multimodal applications and/or interactions such as XHTML+Voice (X+V) markup language. X+V markup language brings spoken interaction to standard Web content by integrating XHTML and XML-Events technologies with XML vocabularies. X+V has been developed as part of the World Wide Web Consortium (W3C) Speech Interface Framework. The profile includes voice modules that support speech synthesis, speech dialogs, command and control, and speech grammars. Voice handlers can be attached to XHTML elements and respond to specific DOM events, thereby reusing the event model familiar to Web developers. Voice interaction features are integrated with XHTML and cascading style sheets (CSS) and can consequently be used directly within XHTML content. Thus, as used herein, rendering can include, but is not limited to, displaying content specified by a multimodal markup language document, playing audio and/or video content specified by the multimodal markup language document, or playing other media types as may be specified by such a document.

The present invention, however, is not limited to the user of any one particular type of markup language. It should be appreciated that other markup languages capable of supporting multimodal applications and/or interactions can be used. For example, another example of a multimodal technology that can be used can be Speech Application Language Tags (SALT).

Continuing with FIG. 1, the proxy server 115 can be a program executing within a suitable information processing system which can perform various translation functions to be described herein. In one embodiment, the proxy server 115 can be implemented as an Hypertext Transfer Protocol (HTTP) server. Regardless of the particular implementation of the proxy server 115, it can extract information from a request, and particularly from speech data, received from the mobile device 105. The extracted information can be used to formulate and construct a request, such as an HTTP request, which can be forwarded to the search engine 120, or other Web-based or network service.

The search engine 120 is a computer program or application which executes in a suitable information processing system. Search engine 120 can respond to queries or requests. Based upon the received request, the search engine 120 can search and retrieve information which conforms to the request. Typically, the search engine performs a keyword or other type of search by comparing parameters specified by a received query with an index maintained by the search engine 120. The index includes a collection of keywords that have been extracted from available content. The keywords of the index further are associated with the source document(s) or an address of such document(s), whether a text file, a markup language document, a multimedia file, or the like. Accordingly, once a match is found between the query parameters and the index, the corresponding file(s) or address(es), are retrieved. The results, whether a list of documents and addresses, or the actual documents, can be returned to the requestor, in this case the proxy server 115.

The proxy server 115 can format received results into a visual presentation that is more suited for display upon a smaller display screen, which is typical of mobile device 105. While any of a variety of different transform techniques can be used, in one embodiment, an Extensible Stylesheet Language (XSL) transform can be used. The proxy server 115 further can dynamically build a voice grammar from the results received from the search engine 120. The voice grammar allows the user to request additional information for each data item in the search results by voice. This grammar can be added to the search results and sent to the mobile device 105 as a multimodal markup language document.

Figure 2:
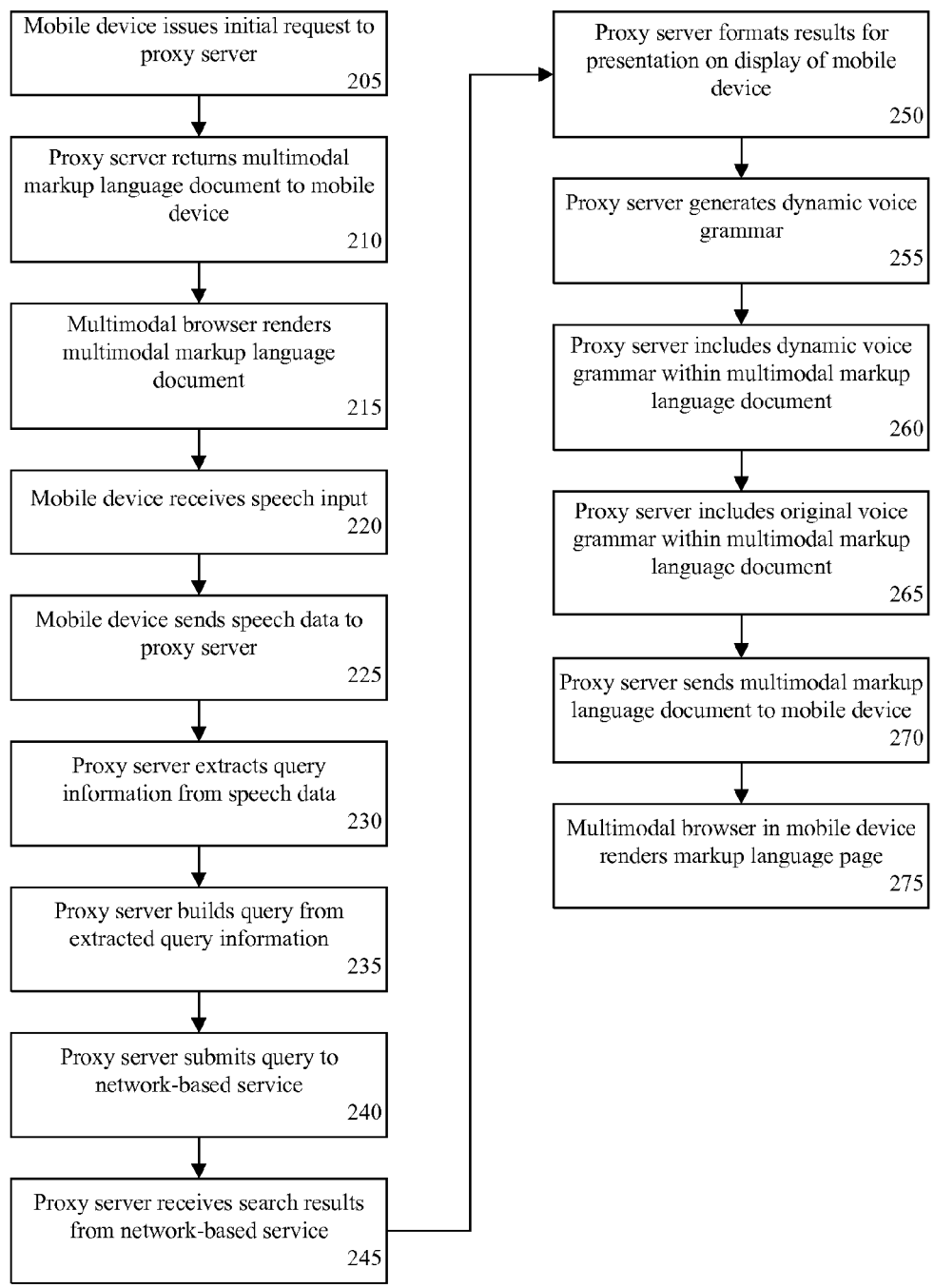
FIG. 2 is a flow chart illustrating a method of retrieving information from a network-based service in accordance with another embodiment of the present invention.

FIG. 2 is a flow chart illustrating a method 200 of retrieving information from a network-based service in accordance with another embodiment of the present invention. In one embodiment, method 200 can be implemented using the system illustrated with reference to FIG. 1. Accordingly, method 200 can begin in step 205, where the mobile device, via the multimodal browser executing therein, issues an initial request to the proxy server. The initial request can request a multimodal markup language document such as an X+V document.

In step 210, the proxy server retrieves the multimodal markup language document identified by the request and forwards the document to the mobile device. This multimodal markup language document can specify or include a voice grammar which allows speech input directed to the mobile device executing the document to be interpreted and/or processed. In step 215, after receiving the multimodal markup language document, the multimodal browser within the mobile device executes or renders the multimodal markup language document. In step 220, the mobile device can receive a speech input from a user. In one embodiment, the speech input can be a spoken search request. For example, a user can say "find pizza restaurants in Boca Raton, Fla.".

In step 225, the mobile device forwards speech data, i.e. the user request, to the proxy server. In one embodiment, the mobile device, and particularly the multimodal browser within the mobile device, can include a speech recognition engine which can convert the user speech to a textual representation. In that case, the speech data sent to the proxy server can be textual representations of received user speech input(s). In another embodiment, speech data can be embodied as audio data, i.e. a digital audio representation of the user speech. In that case, the proxy server can include a speech recognition engine which converts the user speech into a textual representation.

In step 230, the proxy server can extract query information from the received speech data. The speech data can be processed using semantic interpretation. Semantic interpretation allows the proxy server to capture conceptual relationships between smaller concepts and strings. Semantic interpretation can include, but is not limited to, determining the right concept, or sense, for each component of a complex term or phrase. This process can be referred to as semantic disambiguation. The semantic relations which hold among the smaller concepts are identified in order to build more complex concepts.

The extracted data, referred to as query data, can be translated, or used to, build a query in step 235. For example, using semantic interpretation, the proxy server can extract the words "pizza", "restaurant", "Boca Raton", and "Florida" from the user spoken utterance "find pizza restaurant in Boca Raton, Fla.". Semantic interpretation allows the proxy server to effectively identify "pizza" as a modifier of the term "restaurant" indicating a particular type or class of restaurant. Further, location information comprising a city and state is identified which can be used to limit the field of search. The extracted words can function as the parameters within a query that is constructed in step 235. For example, the query that can be constructed from the spoken utterance "find pizza restaurant in Boca Raton, Fla." can be "query=pizza restaurant&city=Boca Raton&state=FL".

In step 240, the proxy server can submit the query that was constructed from the speech data to a network-based service. As noted, in one embodiment, the network-based service can be a search engine, or the like. The network-based service, upon receiving the query from the proxy server, can retrieve the search results and provide the search results to the proxy server. In step 245, the proxy server can receive the search results from the network-based service.

In step 250, the proxy server can format the results received from the network-based service for display upon a display screen of the mobile device. As noted, the display screens of mobile devices, whether handheld, standalone, or embedded devices, typically are small and require special consideration when formatting content for visual presentation. In one embodiment, the proxy server can use a technology such as XSLT transforms to format the received data. In any case, in formatting the search results, the proxy server can generate a multimodal markup language document that specifies the search results. This document can be provided to the mobile device.

In step 255, the proxy server can generate, dynamically, a voice grammar. The voice grammar is generated from the words and/or text included in the search results received from the network-based service. Dynamically creating a voice grammar from the search results allows a user to query the search results and request further information or detail. In step 260, the dynamically created voice grammar can be included within the formatted search results. More particularly, the dynamically created voice grammar can be included, or referenced by, the multimodal markup language document that was created by the proxy server and which specifies the search results. As noted, this allows the user to issue voice requests for further information regarding any of the search result items specified by the multimodal markup language document.

In step 265, the voice grammar that was included in the multimodal markup language document sent to the mobile device in step 210, responsive to the initial request, also can be included within, or referenced by, the multimodal markup language document that specifies the search results. Including the original voice grammar provides the user with greater flexibility in terms of querying the search results using voice commands.

In step 270, the proxy server sends the multimodal markup language document to the mobile device. In step 275, the multimodal browser executing within the mobile device renders the received multimodal markup language document. Thus, mobile device can visually display and/or play content specified by the multimodal markup language document. As noted, since a grammar which was built from the search results is included with the multimodal markup language document, the user can request, via voice, additional information pertaining to any of the search result items.

Figure 3:
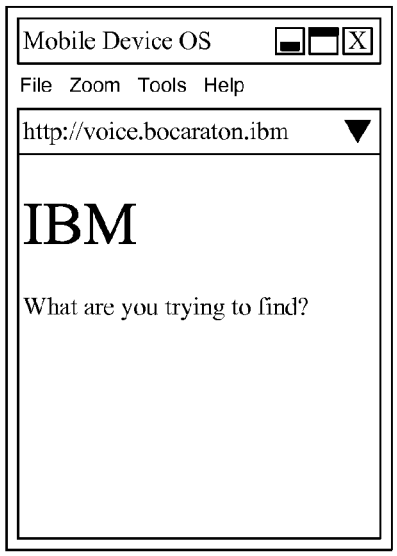
FIG. 3 is a pictorial view of a graphical user interface (GUI) illustrating another aspect of the present invention.

FIG. 3 is a pictorial view of a graphical user interface (GUI) 300 illustrating another aspect of the present invention. GUI 300 illustrates a view of a mobile device display executing a suitable multimodal browser as discussed herein. GUI 300 illustrates the rendering of an initial multimodal markup language document which can be obtained and downloaded from the proxy server. This multimodal markup language document is responsible for receiving the initial user request that will be processed and converted into a request to be submitted to the network-based service.

Figure 4:
FIG. 4 is a pictorial view of a GUI illustrating another aspect of the present invention.

FIG. 4 is a pictorial view of a GUI 400 illustrating another aspect of the present invention. GUI 400 illustrates the rendering of the multimodal markup language document that is returned from the proxy server and which specifies the search results obtained from the network-based service. For example, if the user speech provided as input to the multimodal markup language document of FIG. 3 was "find golf courses in Omaha, Nebr.", that speech data can be provided to the proxy server. The proxy server can process the speech data and extract query parameters (or query information) such as "golf courses", "Omaha", and "NE". This information can be used to build a query such as "query=golf courses&city=Omaha&state=NE". This query can be provided to the network-based service.

As noted, results received from the network-based service can be formatted using a suitable multimodal markup language for display upon a display screen of the mobile device. Thus, GUI 400 illustrates the results obtained from such a query after formatting by the proxy server and rendering by the multimodal browser of the mobile device. While any word specified by the multimodal markup language document rendered in GUI 400 can be included in the dynamically generated voice grammar disclosed herein, in another embodiment, allowable words, or those words included within the grammar can be bolded as shown. It should be appreciated that any suitable means of visually indicating speakable, or allowable, words, i.e. color or the like, also can be used if so desired.

Figure 5:
FIG. 5 is a pictorial view of a GUI illustrating yet another aspect of the present invention.

FIG. 5 is a pictorial view of a GUI 500 illustrating yet another aspect of the present invention. GUI 500 illustrates the case where the user has issued a voice command or query asking for further information regarding golf course 1 from FIG. 4. By speaking one or more words indicating golf course 1, as permitted by the dynamically generated voice grammar, that speech data is provided to the proxy server, processed as discussed herein, and submitted to the network-based service to obtain more detailed information. Results from this most recent query can be returned to the proxy server and formatted. The resulting multimodal markup language document, after rendering, is illustrated by GUI 500. As was the case with reference to FIG. 4, any of the words shown in GUI 500 also can be included within a further dynamically generated grammar thereby allowing the user to access additional detailed information such as a Web link for further details, a Web link for a map of the area surrounding the golf course, or a Web link to the golf courses of the City of Omaha, Nebr.

It should be appreciated that the inventive arrangements disclosed herein can be applied to search and retrieval of any of a variety of different types of information through speech. As such, the various examples discussed herein have been provided for purposes of illustration only and are not intended to limit the scope of the present invention. Further, the various embodiments described herein need not be limited to use with mobile devices. That is, the embodiments described herein can be used with conventional computer systems, whether linked with a communication network via a wired or wireless communication link. Similarly, though the mobile device has been depicted herein as being linked with the communication network through a wireless communication link in FIG. 1, the present invention also contemplates that such a device can be communicatively linked with the proxy server via a wired connection or a combination of both wired and wireless connections.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method carried out by at least one computer, the method comprising acts of:
   receiving a request comprising speech data from a mobile device;
   querying a network service using query information obtained from the speech data, whereby search results are received from the network service;
   formatting the search results for presentation on a display of the mobile device;
   generating a voice grammar based at least in part on the search results; and
   sending the search results and the voice grammar generated from the search results to the mobile device.

2. The method of claim 1, further comprising acts of:
   selecting a term from the speech data; and
   dynamically building a query and including the term selected from the speech data within the query, wherein the act of querying further comprises sending the query to the network service.

3. The method of claim 2, wherein the speech data comprises digitized audio, the method further comprising an act of converting the speech data into a textual representation of the speech data.

4. The method of claim 1, wherein the act of sending further comprises resending, to the mobile device, a different voice grammar from a prior transaction with the mobile device, with the search results and the voice grammar.

5. The method of claim 1, wherein the act of generating the voice grammar comprises selecting a term from the search results and dynamically generating the voice grammar to include the term selected from the search results, and wherein formatting the search results comprises creating a multi-modal markup language document which, upon execution, causes the term from the search results to be displayed upon a display screen of the mobile device, wherein the voice grammar is part of the multi-modal markup language document.

6. The method of claim 5, further comprising acts of:
   receiving a subsequent request comprising speech data from the mobile device, wherein the subsequent request specifies the term from the search results;
   building a subsequent query using the term specified in the speech data of the subsequent request; and
   sending the subsequent query to the network service.

7. The method of claim 2, wherein the speech data comprises a textual representation of user speech captured by the mobile device.

8. The method of claim 5, wherein, upon execution of the multi-modal markup language document by the mobile device, a user utterance comprising the term selected from the search results causes the mobile device to initiate a request for further information regarding the term selected from the search results.

9. The method of claim 1, wherein the at least one computer comprises a proxy server.

10. The method of claim 1, wherein the search results represent a subset of information queried 11. An article of manufacture, comprising:
at least one computer-readable non-transitory storage medium having encoded thereon instructions which, when executed by at least one processor, perform a method comprising acts of:
receiving a request comprising speech data from a mobile device;
querying a network service using query information obtained from the speech data, whereby search results are received from the network service;
formatting the search results for presentation on a display of the mobile device;
generating a voice grammar based at least in part on the search results; and
sending the search results and the voice grammar generated from the search results to the mobile device.

12. The article of manufacture of claim 11, wherein the method further comprises acts of:
selecting a term from the speech data; and
dynamically building a query and including the term selected from the speech data within the query, wherein the act of querying further comprises sending the query to the network service.

13. The article of manufacture of claim 12, wherein the speech data comprises digitized audio, and wherein the method further comprises an act of converting the speech data into a textual representation of the speech data.

14. The article of manufacture of claim 12, whrein the speech data comprises a textual respresentation of user speech captured by the mobile device.

15. The article of manufacture of claim 11, wherein the act of sending further comprises resending, to the mobile device, a different voice grammar from a prior transaction with the mobile device, with the search results and the voice grammar.

16. The article of manufacture of claim 11, wherein the act of generating the voice grammar comprises selecting a term from the search results and dynamically generating the voice grammar to include the term selected from the search results, and wherein formatting the search results comprises creating a multi-modal markup language document which, upon execution, causes the term from the search results to be displayed upon a display screen of the mobile device, wherein the voice grammar is part of the multi-modal markup language document.

17. The article of manufacture of claim 16, wherein the method further comprises acts of:
receiving a subsequent request comprising speech data from the mobile device, wherein the subsequent request specifies the term from the search results;
building a subsequent query using the term specified in the speech data of the subsequent request; and
sending the subsequent query to the network service.

18. The article of manufacture of claim 16, wherein, upon execution of the multi-modal markup language document by the mobile device, a user utterance comprising the term selected from the search results causes the mobile device to initiate a request for further information regarding the term selected from the search results.

19. The article of manufacture of claim 11, wherein the search results represent a subset of information queried when querying the network service.

20. A system comprising at least one proxy server programmed to:
receive a request comprising speech data from a mobile device;
query a network service using query information obtained from the speech data, whereby search results are received from the network service;
format the search results for presentation on a display of the mobile device;
generate a voice grammar based at least in part on the search results; and
send the search results and the voice grammar generated from the search results to the mobile device.

21. The system of claim 20, wherein the at least one proxy server is further programmed to:
select a term from the speech data;
dynamically build a query and include the term selected from the speech data within the query; and
send the query to the network service.

22. The system of claim 21, wherein the speech data comprises digitized audio, and wherein the at least one proxy server is further programmed to convert the speech data into a textual representation of the speech data.

23. The system of claim 21, wherein the speech data comprises a textual representation of user speech captured by the mobile device.

24. The system of claim 20, wherein the at least one proxy server is further programmed to send to the mobile device a different voice grammar from a prior transaction with the mobile device.

25. The system of claim 20, wherein the at least one proxy server is further programmed to generate the voice grammar at least in part by selecting a term from the search results and dynamically generating the voice grammar to include the term selected from the search results, and wherein the at least one proxy server is further programmed to format the search results at least in part by creating a multi-modal markup language document which, upon execution, causes the term from the search results to be displayed upon a display screen of the mobile device, wherein the voice grammar is part of the multi-modal markup language document.

26. The system of claim 25, wherein the at least one proxy server is further programmed to:
receive a subsequent request comprising speech data from the mobile device, wherein the subsequent request specifies the term from the search results;
build a subsequent query using the term specified in the speech data of the subsequent request; and
send the subsequent query to the network service.

27. The system of claim 25, wherein, upon execution of the multi-modal markup language document by the mobile device, a user utterance comprising the term selected from the search results causes the mobile device to initiate a request for further information regarding the term selected from the search results.

28. The system of claim 20, wherein the search results represent a subset of information queried when querying the network service.

* * * * *